United States Patent [19]

Uchikune et al.

[11] 4,408,752

[45] Oct. 11, 1983

[54] MAGNETIC CHUCK

[75] Inventors: Mamoru Uchikune; Kiyoshi Yanagisawa; Mutsukazu Tagami, all of Ueda; Taketo Shimizu, Nagano; Kunio Horiuchi; Hiroo Sakaguchi, both of Ueda, all of Japan

[73] Assignee: Kanetsu Kogyo Kabushiki Kaisha, Nagano, Japan

[21] Appl. No.: 286,561

[22] Filed: Jul. 24, 1981

[30] Foreign Application Priority Data

Aug. 21, 1980 [JP] Japan .................................. 55-114077

[51] Int. Cl.³ .............................................. B25B 11/00
[52] U.S. Cl. ........................................ 269/8; 335/295
[58] Field of Search ............................ 335/295; 269/8;
51/216 R; 248/206 A

[56] References Cited

U.S. PATENT DOCUMENTS

| 1,079,546 | 11/1913 | Downes et al. | 269/8 |
|---|---|---|---|
| 1,222,052 | 4/1917 | Walker | 269/8 |
| 1,330,558 | 2/1920 | Simmons | 269/8 |
| 3,179,858 | 4/1965 | Binder et al. | 335/295 |
| 3,258,658 | 6/1966 | Vaughn | 335/295 |
| 3,336,551 | 8/1967 | Steed . | |

FOREIGN PATENT DOCUMENTS 899248  6/1962  United Kingdom .................. 269/8

Primary Examiner—Robert C. Watson
Attorney, Agent, or Firm—John O. Graybeal

[57] ABSTRACT

A switchable magnetic chuck has a magnet assembly slidably arranged in a casing to magnetize and demagnetize a top plate disposed in an open side of the casing. The top plate is provided with main pole members and auxiliary pole members which are arranged alternatively in the sliding direction of the magnet assembly, separated respectively by a non-magnetic separator disposed between them. To smoothen the change-over operation, enhance magnetic force under the magnetized condition and reduce residual attraction under the demagnetized condition, each main pole member is formed on the side facing the magnet assembly with an extension extending between the auxiliary pole member adjacent thereto and the magnet assembly.

6 Claims, 6 Drawing Figures

MAGNETIC CHUCK

BACKGROUND OF THE INVENTION

This invention relates to a magnetic chuck which can be changed over to retain a removable magnetic body, and more particularly to a magnetic chuck in which magnetic fluxes of permanent magnets are guided to a workpiece through magnetic materials to retain the workpiece and kept away from the workpiece to permit removal of the workpiece.

Magnetic chucks are well known in which a top plate having pole members of magnetic material alternating with separators of non-magnetic material is disposed above a base plate, i.e. magnet assembly having alternating yokes of magnetic material and permanent magnets. Magnetic fluxes from said permanent magnets of the magnet assembly are guided to a workpiece through the pole members of the top plate, magnetically holding the workpiece to the mounting surface of the top plate. By changing the position of said magnet assembly in relation to said top plate, the magnetic fluxes are diverted from the mounting surface and the workpiece can be removed. These well known magnetic chucks are of a type in which the fluxes are guided away from the workpiece or prevented from reaching it by separating the base plate or magnet assembly from the top plate and inducing magnetic lines of force to a bottom plate of magnetic material of the case receiving said magnet assembly. This diminishes the magnetic fluxes at the mounting surface of the top plate. Also known is a type of magnetic chuck in which the magnet assembly is slid laterally in relation to the top plate to change the paths of the loops of magnetic fluxes flowing from the permanent magnets. The present invention relates to the latter type of chuck.

Some magnetic chucks have auxiliary poles of magnetic members for inducing magnetic fluxes arranged between respective main pole members, and whereby thin magnetic poles are arranged on a surface of the magnetic chuck or top plate in order to hold thin workpieces or several small size magnetic parts firmly. In such magnetic chucks, when said magnetic assembly is slid laterally in relation to the top plate, the yokes of the base plate may not be oriented precisely in place depending on the accuracy of finishing of the respective main pole members, auxiliary pole members and separators and the accuracy of assembling the base plate poor finishing or assembly allows the magnetic fluxes to leak from the top plate to the workpiece to apply slight attraction when the magnetic assembly is shifted to its demagnetized position i.e. residual attraction thereto. This condition will be described with reference to FIG. 1. Permanent magnets 2 and yokes 1 are arranged alternatively to constitute a base plate, i.e. magnetic assembly 3. Opposed to this magnetic assembly 3 is disposed a top plate 7 having main pole members 4, auxiliary pole members 5 and separators 6 arranged to constitute a magnetic chuck together with a case, not shown. When the respective yokes 1 of the magnet assembly 3 are placed in the position shown by the solid lines in FIG. 1, i.e. opposed to the main pole members 4, the magnetic chuck is in magnetized condition. In this magnetized condition, fluxes 8 extend over the top plate 7 into workpiece 9, as shown in the drawing, and magnetically hold the workpiece 9. When the magnet assembly 3 is slid in the direction of arrow 10 to place the magnetic chuck in its the non-magnetized condition, the yokes 1 of the magnet assembly 3 are placed in the position shown by the phantom lines in FIG. 1, i.e. opposed to the auxiliary pole members so that magnetic fluxes 11 passing through the respective yokes 1 from loops. Consequently, the fluxes directed over the top plate 7 into the workpiece disappear, permitting the workpiece 9 to be removed. However, if the accuracy of finishing and assembling the respective parts is unsatisfactory, some yokes 1 of the base plate 3 may not be placed opposed to the center of the auxiliary pole member 5 such that $b/a \neq 1$, where a and b respectively represent distances between either side of a yoke 1 and each auxiliary pole member 5 located on either side of the main pole member 4 corresponding to said yoke 1. Thus, magnetic fluxes 12 will leak over the top plate 7 into the workpiece 9 and cause residual attraction even in the non-magnetized condition.

SUMMARY OF THE INVENTION

An object of this invention is to provide a magnetic chuck which can reduce the residual attraction under the non-magnetized condition while enhancing the magnetic attraction under the magnetized condition.

Conventional magnetic chucks have a top plate with main pole members and auxiliary pole members that are formed such that the main pole members and auxiliary pole members form a flat mounting surface at the top plate side facing a workpiece. Because the auxiliary pole members are shorter than the main pole members, cavities 13 are created between the auxiliary pole members and the base plate. The cavities are hollow or are filled with non-magnetic fillers. This invention in consideration of this point is characterized in that a portion of each main pole member facing the magnet assembly extends in the sliding direction of the magnet assembly, i.e. below the adjacent auxiliary pole member so as to be interposed between the auxiliary pole member and the magnet assembly.

DESCRIPTION OF THE PREFERRED EMBODIMENTS

Hereinafter will be described this invention with reference to its embodiments.

Figure 2:
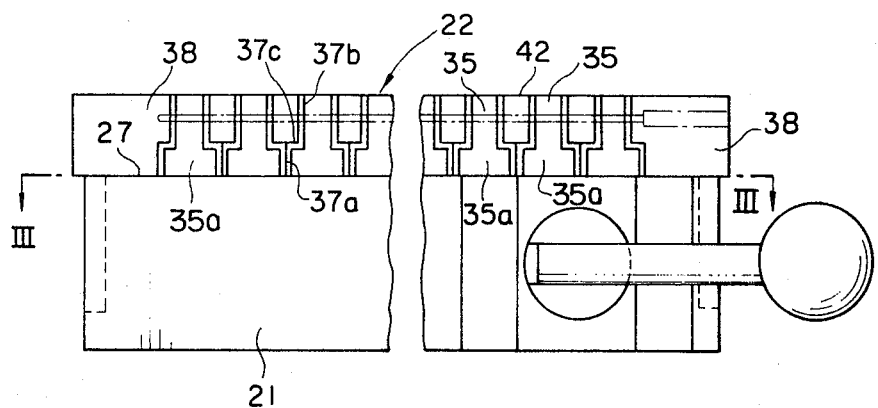
FIG. 2 is a front view showing a magnetic chuck according to this invention.
Figure 3:
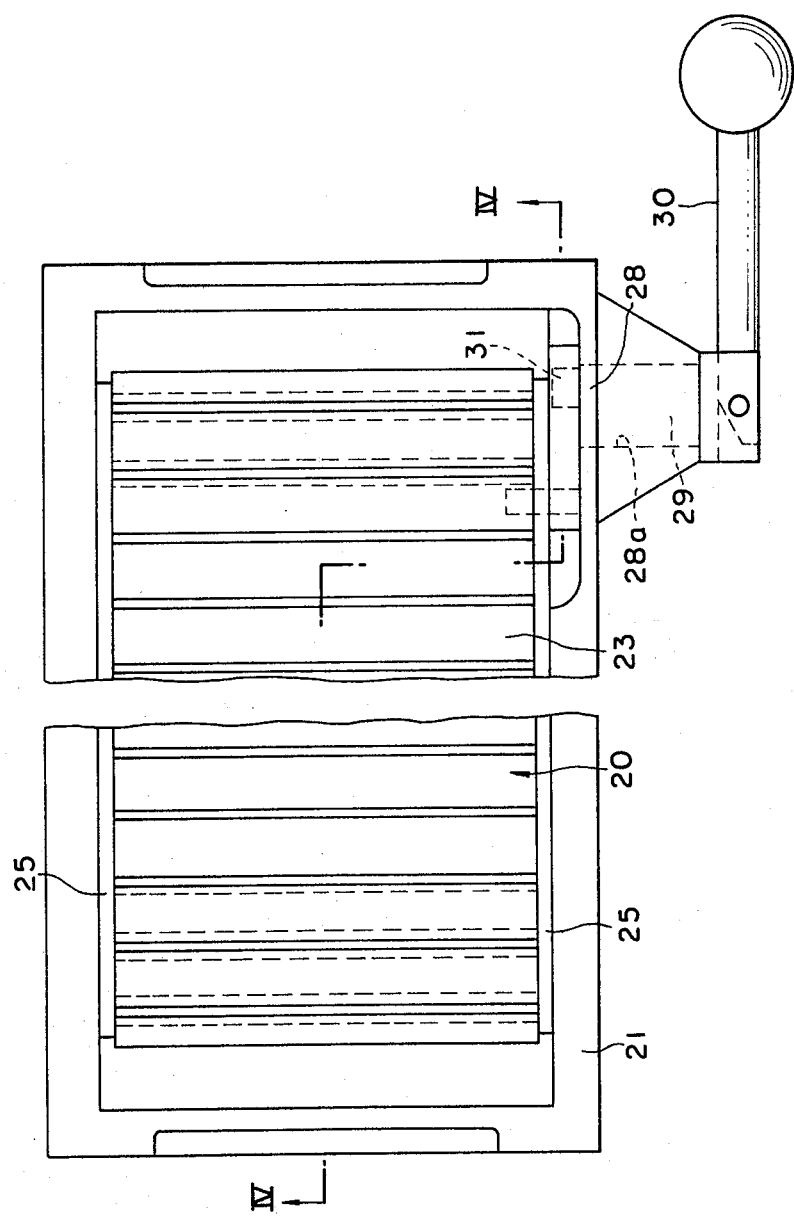
FIG. 3 is a sectional view taken along the line III—III of FIG. 2.
Figure 4:
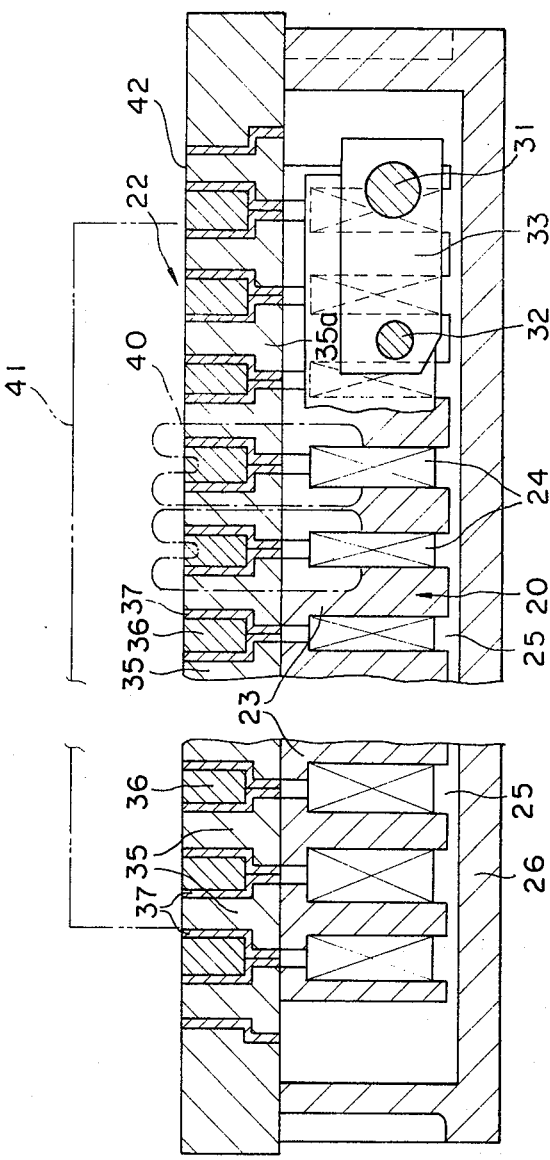
FIG. 4 is a sectional view taken along the line IV—IV of FIG. 3.

As shown in FIGS. 2 to 4, a magnetic chuck according to this invention includes a base plate or magnetic assembly 20, a casing 21 for receiving the magnetic assembly and a top plate 22.

The base plate or magnet assembly 20 has yokes 23 of magnetic material alternating with permanent magnets 24, which are bonded to each other, and is provided on both sides with guide plates 25. The lower edge of each guide plate 25 is mounted on a bottom plate 26 of the casing 21 to receive the magnetic assembly 20 therein so that the magnet assembly 20 can slide traversely to the longitudinal direction of the yokes 23 and permanent magnets 24. While the yokes 23 located between the permanent magnets 24 have a T-shaped section in this embodiment, yokes having an I-shaped section may be used alternatively. Said permanent magnets 24 sandwich the yokes 23 between pole surfaces having identical polarities (S.S. or N,N).

The casing 21, preferably formed of non-magnetic material, receives and slidably supports the magnet assembly 20 and forms a box which is upwardly open, as indicated at 27. This casing 21 is provided on one side near the end thereof with a boss 28 having a hole 28a through which a shaft 29 extends rotatably. A handle 30 is located on the outer end of the shaft 29. The shaft 29 is formed on the inner end with a crank 31 which is rotatably inserted into a hole provided in a crank rod 33. The crank rod 33 is mounted pivotably on a shaft 32 extending from the magnet assembly 20.

The top plate 22 has main pole members 35,38 of magnetic material alternating with auxiliary pole members 36 and respectively sandwiched between separators 37 of non-magnetic material. The first main pole members 35 are formed such that the portions 35a facing the magnet assembly 20 extend in the sliding direction of the magnet assembly 20, i.e. horizontal direction as viewed in FIG. 2 and FIG. 4, and each pole member 35 has an inverted generally T-shaped section. The auxiliary pole members 36 are formed to have a rectangular section. The lengthwise dimension of the extension 35a of each main pole member 35 in the sliding direction of said magnet assembly 20 is approximately equal to the corresponding dimension of the upper portion of the yoke 23. Each separator 37 is interposed between a main pole member 35 and an auxiliary pole member 36, and is formed with two parallel portions 37a,37b and an intermediate portion 37c connecting opposed ends of the parallel portions to define a stretched-out Z-shaped section. The separators 37 are constituted by a pair of non-magnetic crank-shaped pieces which together define a upwardly open recess for receiving an auxiliary pole member 36 and cooperate with each other to form a separator assembly having a generally Y-shaped section. The main pole members 38 constituting both ends of the top plate 22 have a substantially L-shaped section. Between these main pole members 38 are disposed sequentially a separator 37, a main pole member 35, a separator 37, an auxiliary pole member 36, a separator 37, a main pole member 35, and so on in the order as shown in FIG. 2, all secured fixedly to each other. The may be secured fixedly to each other by welding brazing, bonding, etc. Preferably they are relatively simply fixed in the top plate 22 by providing a first pair of holes through each main pole member 35, but not the second main pole members 38, and a second pair of holes through one main pole member 38, having larger diameters than that of the first holes. In the other main pole member 38, a pair of threaded holes is disposed therein, thereby allowing long bolts of non-magnetic material to be inserted from one side of the main pole member 38, through the respective holes in the first main pole members 35, and inserted into the threaded holes.

Figure 6:
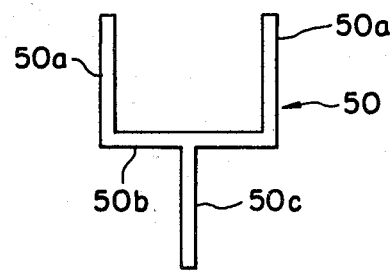
FIG. 6 is a front view showing another embodiment of separators.

FIG. 6 shows a separator 50 of another configuration. This separator 50 comprises two parallel portions 50a an intermediate portion 50b interconnecting one ends of both parallel portions 50a, and a leg portion 50c extending from the middle of this intermediate portion 50b parallel to said parallel portions 50a in the opposite direction therefrom to cooperatively define an approximately Y-shaped section. The separator shown in FIG. 6 is an integrally molded member having a generally Y-shaped section. Of course in this case said parallel portions 50a are spaced from each other enough for receiving the auxiliary pole member 36 between them.

When thus formed top plate 22 is fixedly secured to the casing 21 by screws (not shown) such that a flush surface defined by the main pole members 35,38 and auxiliary pole members 36 are located at the side opposite from the magnet assembly 20, and the extensions 35a of the main pole members 35 facing the magnet assembly 20 are interposed between the adjacent auxiliary pole members 36 and magnet assembly 20 to complete the magnetic chuck according to this invention.

In operation, when the handle 30 is turned to the position shown in FIG. 2 to magnetize the magnetic chuck, the base plate or magnet assembly 20 and top plate 22 occupy the relative positions shown in FIG. 4. Namely, the respective yokes 23 of the magnet assembly 20 are located opposed to the main pole members 36 of the top plate 22. Hence magnetic fluxes from the each permanent magnet 24 of the base plate 20 form a loop 40. In each loop 40, the fluxes are induced through one of the yokes 23 to one of the main pole members 35 of the top plate 22 and from this main pole member 35 to a magnetic workpiece 41, then returned from the auxiliary pole member 36 again to the workpiece 41 and thereafter passed through the adjacent main pole member 35 to the adjacent yoke 23. In this case, since the respective permanent magnets 24 of the magnet assembly 20 are arranged so as to invert the magnetizing direction, the directions of magnetic fluxes in the adjacent loops are opposite to each other. Thus, the workpiece 41 is secured fixedly to the mounting surface 42 of the magnetic chuck, i.e. the mounting surface defined by the main pole members 35,38, auxiliary pole members 36 and separators 37.

Under said magnetized condition of the magnetic chuck according to this invention, each main pole member 35 contacts on the lower surface of said extension 35a uniformly with the upper surface of each corresponding yoke 23. Thus, each main pole member 35 contacts the corresponding yoke 23 on a broader area than that in said conventional magnetic chuck shown in FIG. 1. Hence, the magnetic fluxes from the yokes 23 to the corresponding main pole members 35 or vice versa do not pass through a conventional narrow contact portion, and thereby the contact portions between said main pole members 35 and yokes 23 are not saturated with the magnetic fluxes so that the magnetic saturation in said contact portion is diminished. Consequently, the magnetic attraction on the mounting surface 42 is remarkably enhanced to securely and firmly hold magnetic workpieces on the mounting surface.

Figure 1:
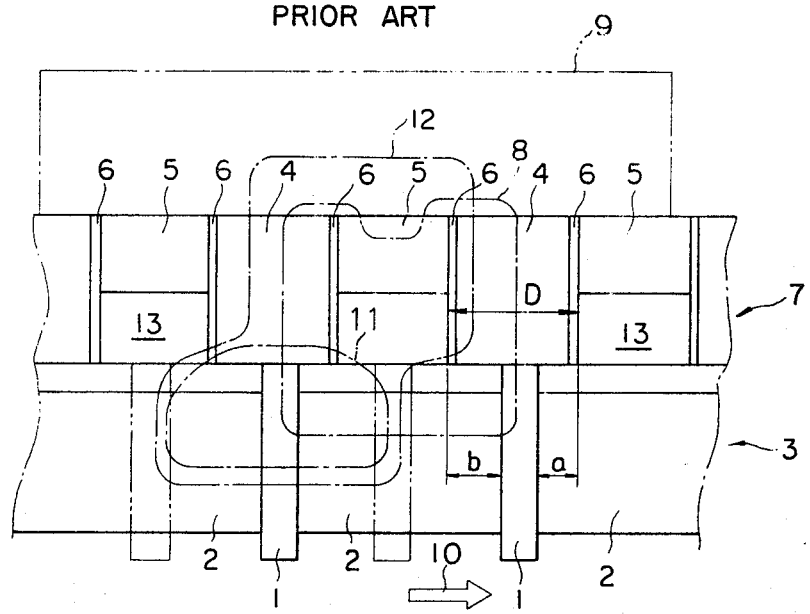
FIG. 1 is an explanatory view showing a condition of a conventional magnetic chuck under which magnetic fluxes leak.

In a conventional magnetic base shown in FIG. 1, it is considered that the dimension of each main pole member 4 in the sliding direction of the base plate 3 is increased as a whole to increase the contact area between the main pole members 4 and yokes 1. However, this is extremely disadvantageous for holding small-sized magnetic bodies since pitch of the magnetic pole on the mounting surface is increased by such method.

On the other hand, in said magnetic chuck according to this invention, the magnetic attraction can be enhanced without increasing the pitch of the magnetic pole on the mounting surface 42, as mentioned above.

Figure 5:
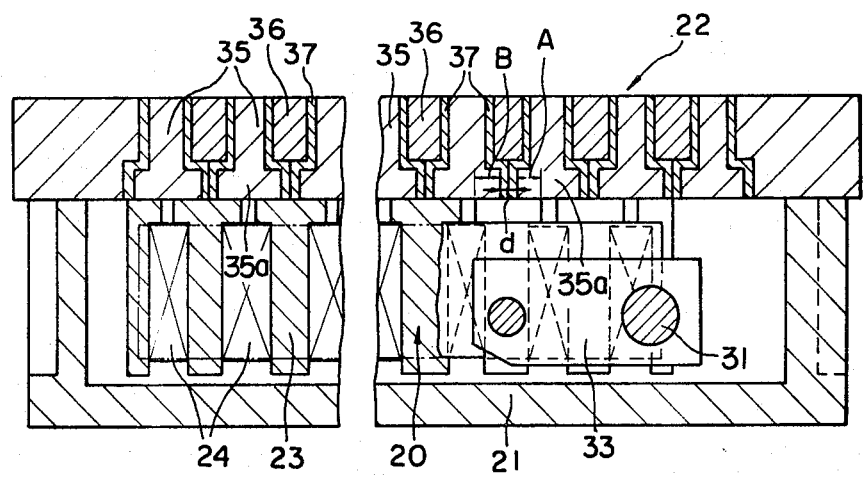
FIG. 5 is a sectional view, similar to FIG. 4, showing the position of the base plate under which a workpiece is removed from the magnetic chuck.

For demagnetizing the magnetic chuck to remove the workpiece from the mounting surface 42 the handle 30 is rotated to the left side, i.e. demagnetization position. By this pivoting of the handle 30 the crank 31 is moved to the opposite side spaced 180° from the position shown in FIG. 3. This movement pivots the crank rod 33 while being transmitted to the magnet assembly 20. The magnet assembly 20 slides on the bottom 26 of the casing 21 to occupy a position shown in FIG. 5. As a result, the yokes 23 of the magnet assembly 20 are located opposed to the auxiliary pole members 36 of the top plate 22 which guides the loops of magnetic flux away from the workpiece 41 which can then be removed from the magnetic chuck. Thus even if there are errors in finishing the respective yokes 23 and permanent magnet 24 of the base plate 20 and the main pole members 35, auxiliary pole members 36 and separators 37 of the top plate 22 and additional errors in assembling the respective members, gaps d between the respective extensions 35a are sufficiently small compared with gaps D between the respective main pole members shown in FIG. 1, since the lower portion of the main pole member 35 opposed to the magnet assembly 20 is extended in the sliding direction of the magnet assembly 20. Hence, even if the yokes of the base plate 20 are not located in place, i.e. B/A≠1, B/A can approach 1 closer than said b/a. As shown in FIG. 5, since the lengthwise contact dimension A of one main pole member 35 contacting one yoke 23 and the lengthwise contact dimension B of the other main pole member 35 are respectively larger than those of the conventional ones, the value of B/A can approach 1 closer than the value of b/a in said conventional magnetic chuck so that the effect of errors of finishing and assembling on the gaps d is small. Hence, the residual attraction affecting the workpiece is very small compared with that in the conventional magnetic chuck.

The magnetic chuck according to this invention can enhance the attraction and is minimally affected by the errors of finishing and assembling the members winch constitute the magetic chuck. The workpiece is not or hardly affected by the residual attraction, and thus easily removed from the magnetic chuck. Also, since the sliding surface of the magnetic materials, i.e. sliding surface of the main pole member, is large, the density of magnetic flux in the sliding surface is small and magnetic sliding resistance in change-over operation is small so that the magnet assembly can be easily slid to permit a smooth change-over operation.

We claim:
1. A magnetic chuck operative to removably retain magnetic substances with magnetic force, comprising: a casing opening at one side; a top plate fixed to the open side of said casing to define a mounting surface for said magnetic substance and having a plurality of elongate magnetic main pole members and auxiliary pole members alternatively arranged in a side-by-side manner and integrally incorporated to close such open side and sandwich thin non-magnetic separators therebetween; and a magnet assembly received in said casing and slidable laterally of said main pole members and auxiliary pole members to magnetize and demagnetize the mounting surface of the top plate and having a plurality of magnetic yokes and permanent magnets alternatively arranged in a side-by-side manner in the sliding direction, the said main pole members having on the side facing said magnet assembly laterally extending portions partially overlapping the adjacent said auxiliary pole members so as to be interposed between the auxiliary pole members and the magnet assembly, and in contact with the magnet assembly to permit the magnet assembly to be slid and to enable the chuck to retain thin workpieces or several small size magnetic substances firmly.

2. A magnetic chuck as defined in claim 1, wherein said main pole member extensions contact respectively with corresponding yokes of said magnet assembly.

3. A magnetic chuck as defined in claim 1, wherein the dimension of each said extension measured in the sliding direction of said magnet assembly is approximately equal to that of each said corresponding yoke in the sliding direction.

4. A magnetic chuck as defined in claim 1, wherein said main pole member comprises a plurality of first pole members having an inverted T-shaped section and a pair of second main pole members having an L-shaped section, said respective auxiliary pole members having a rectangular section and said respective separators comprising non-magnetic pieces having a crank-shaped section, certain of said non-magnetic pieces being combined to form cooperatively a Y-shaped section to define a recess for receiving said auxiliary pole member, the said first and second main pole members, auxiliary pole members and separators being integrally combined by fastening bolt means to constitute said top plate.

5. A magnetic chuck as defined in claim 1, wherein said non-magnetic separators have a Y-shaped section and each is constituted integrally from a pair of parallel portions between which is received an auxiliary pole member, and each has an intermediate portion interconnecting the ends of the parallel portions and leg extending from the central portion of the intermediate portion.

6. A magnetic chuck as defined in claim 1, wherein the magnetic yokes of the magnet assembly and the magnetic main pole members are each generally T-shaped in cross-section, with the extended cross-arms portions thereof respectively facing each other, and with each substantially the same width in the sliding direction, the magnetic substance retaining surface of the top plate being made up entirely of the main pole members and auxiliary pole members, with thin non-magnetic separators therebetween, and the surfaces of the top plate contacting the yokes of the magnet assembly being made up entirely of said main pole members except for said thin non-magnetic separators therebetween.

* * * * *